United States Patent [19]

Moronaga et al.

[11] Patent Number: 5,276,841
[45] Date of Patent: Jan. 4, 1994

[54] AUDIO/VIDEO DATA REPRODUCING APPARATUS WHICH GENERATES END OF DATA TRANSFER SIGNAL AND WHICH TRANSFERS DATA AFTER COMMUNICATION ERROR WITHOUT RESETTING ADDRESS DATA

[75] Inventors: Kenji Moronaga; Mikio Watanabe; Katsuya Makioka, all of Tokyo, Japan

[73] Assignee: Fuji Photo Film Co., Ltd., Kanagawa, Japan

[21] Appl. No.: 682,522

[22] Filed: Apr. 9, 1991

[30] Foreign Application Priority Data

Apr. 20, 1990 [JP] Japan .................. 2-102856

[51] Int. Cl.⁵ .................. G06F 12/02
[52] U.S. Cl. .................. 395/425; 364/DIG. 1
[58] Field of Search .................. 364/200; 358/209; 395/164, 166; 364/900; 358/211; 395/400; 395/425

[56] References Cited

U.S. PATENT DOCUMENTS

| | | |
|---|---|---|
| 3,829,837 | 8/1974 | Farr, Jr. .................. 340/172.5 |
| 4,754,394 | 6/1988 | Brantley, Jr. et al. .................. 364/518 |
| 4,930,014 | 5/1990 | Maeda et al. .................. 358/209 |
| 4,985,848 | 1/1991 | Pfeiffer et al. .................. 364/518 |
| 5,016,107 | 5/1991 | Sasson et al. .................. 358/209 |
| 5,018,017 | 5/1991 | Sasaki et al. .................. 358/209 |
| 5,032,927 | 7/1991 | Watanabe et al. .................. 358/335 |
| 5,130,813 | 7/1992 | Oie et al. .................. 358/335 |
| 5,138,503 | 8/1992 | Nishida et al. .................. 360/35.1 |

Primary Examiner—Joseph L. Dixon
Assistant Examiner—Reba I. Elmore
Attorney, Agent, or Firm—Birch, Stewart, Kolasch & Birch

[57] ABSTRACT

An audio/video data reproducing apparatus reads out data from a first storage, which has its storage area equally divided into clusters and stores audio/video data on a cluster-by-cluster basis, to transfer the data read out to utility equipment over a communication path. A second storage stores address data designating clusters of the first storage. Clusters including data to be read out are searched for, and the address data designating the clusters thus searched for is stored in the second storage in a predetermined order. The address data is then sequentially read out from the second storage to generate a real address addressing a storage location of the storage area, which is in turn provided with the real address to develop the stored data in the predetermined order. In response to an error occurring during the transmission on the communication path, the second storage is interrupted from developing the address data therefrom. In response to an amount of the audio/video data corresponding to the capacity of one cluster having been transferred, the second storage develops address data designating another cluster including following data to be read out to generate a real address accordingly. When the clusters associated with the audio/video data already transferred reach in number the clusters searched for, an end-of-read signal is developed.

10 Claims, 4 Drawing Sheets

Fig. 4

| AREA | ADDRESS (HEXADECIMAL) | NUMBER OF BYTES | CONTENT |
|---|---|---|---|
| HEADER | 000000 | 1 | CARD NO. |
| | 000001~0004 | 4 | KIND OF MEMORY |
| | 000005~0006 | 2 | NUMBER OF REMAINING CLUSTERS |
| | 000007~0008 | 2 | NUMBER OF PACKETS USED |
| | 000009~03FF | 1015 | USER AREA |
| PACKET INFORMATION AREA | 000400 | 1 | CONTENT OF PACKET 1 |
| | 000401 | 1 | CONTENT OF PACKET 2 |
| | ≀ | ≀ | ≀ |
| | 0007FE | 1 | CONTENT OF PACKET 1023 |
| | 0007FF | 1 | DUMMY AREA |
| DIRECTORY | 000800~0801 | 2 | PACKET 1 START CLUSTER |
| | 000802~0803 | 2 | PACKET 2 START CLUSTER |
| | ≀ | ≀ | ≀ |
| | 000FFC~0FFD | 2 | PACKET 1023 START CLUSTER |
| | 000FFE~0FFF | 2 | DUMMY AREA |
| MAT | 001000~1001 | 2 | CLUSTER 1 MAT |
| | 001002~1003 | 2 | CLUSTER 2 MAT |
| | ≀ | ≀ | ≀ |
| | 0017FC~17FD | 2 | CLUSTER 1023 MAT |
| | 0017FE~17FF | 2 | DUMMY AREA |
| | 001800~1FFF | 2048 | SPARE |
| DATA | 002000~ | | VIDEO DATA (INCLUDING HEADER INFORMATION) |

AUDIO/VIDEO DATA REPRODUCING APPARATUS WHICH GENERATES END OF DATA TRANSFER SIGNAL AND WHICH TRANSFERS DATA AFTER COMMUNICATION ERROR WITHOUT RESETTING ADDRESS DATA

BACKGROUND OF THE INVENTION

1. Field of the Invention

The present invention relates to an apparatus for reproducing audio data or video data out of a recording medium which is equally divided into a plurality of storage units each having a predetermined capacity. More particularly, the present invention is concerned with an audio/video data reproducing apparatus capable of transferring data read out of the recording medium to external equipment over a communication path.

2. Description of the Background

It is a common practice with a semiconductor memory or similar memory to record video data or audio data therein after coding by compression in order to reduce the amount of data to be recorded. The semiconductor memory may be equally divided into a plurality of storage units, or clusters, each having a predetermined capacity, as proposed by the same applicant as the present application and disclosed in Japanese patent application No. 10997/1989 by way of example. In such a case, one or more of the clusters of the memory are used to record desired audio data or video data.

Specifically, the recording scheme disclosed in the above Japanese patent application divides a memory into a plurality of clusters and uses the first cluster for storing supervisory data and the others for recording video data. The memory has a supervisory data area which is assigned to a directory and a memory allocation table (MAT). When compressed image data is to be recorded in a plurality of clusters, for example, the number assigned to the cluster to record the leading video data is written into the directory of the supervisory area while the number assigned to the cluster immediately following the above-mentioned cluster is written into the MAT. Video data is written in and read out of the memory with reference being made to such supervisory data.

For example, to record new video data in the memory, the number of clusters necessary to accommodate the video data is determined, and then more than such a number of non-recorded or empty clusters available in the memory are searched for. Thereafter, the video data are sequentially recorded in the empty clusters. On the other hand, to read desired video data out of the memory, recorded or full clusters storing the video data of interest are searched for in memory beforehand, and then the video data are reproduced.

The conventional audio/video data reproducing apparatus described above has some problems left unsolved, as follows. Assume that audio data or video data are transferred from the reproducing apparatus to a word processor or similar external equipment which is connected to the apparatus by a communication path. Then, as a communication error occurs on the communication path or in the equipment connected to the communication path while the data transfer is under way, it is necessary that all the data of the cluster reached at that moment be transferred again to the equipment afterwards. At this instant, the coventional reproducing apparatus is required to set the address data of such a particular cluster all over again. In addition, even when desired data such as video data have been fully read out of an expected number of clusters and transferred from the reproducing apparatus to the external equipment, the reproducing apparatus cannot recognize the end of transfer of the data to the external equipment.

SUMMARY OF THE INVENTION

It is therefore an object of the present invention to provide an audio/video data reproducing apparatus capable of resuming the transfer of data rapidly when a communication error occurs on a communication path or in external equipment connected thereto.

It is another object of the present invention to provide an audio/video data reproducing apparatus capable of recognizing the end of transfer of an expected amount of data to external equipment over a communication path.

In accordance with the present invention, an audio/video data reproducing apparatus uses a first storage which stores at least either one of audio data and video data, has a storage area thereof equally divided into a plurality of storage units each having a predetermined capacity, and stores at least either one of the data on a storage unit basis, and reads the data out of the first storage while transferring them to external equipment over a communication path. A second storage stores, in a predetermined order, address data which designate storage units of the first storage which store data to be read out. A read-out control section causes the second storage to perform a step-by-step operation when the address data are sequentially read out of the second storage. A control section searches for, before read-out of at least either one of the data, storage units of the first storage from which the data should be read out and stores in the second storage address data designating a required number of storage units. A data counter counts at least either one of the data and, when the data reaches a predetermined amount corresponding to the capacity of one storage unit of the first storage, produces a change request signal for changing the storage unit of the first storage to the next storage unit from which data should be read out next and for reading at least either one of the data. An address generator reads, in response to the change request signal, address data of the storage init from which data should be read next out of the second storage, generates a real address based on the address data, and feeds the real address to the first storage. A detecting section compares the required number of storage units determined by the control section and the number of storage units from which at least either one of the data has been read and, when the two numbers coincide, produces an end-of read signal. An interface circuit transfers video data read out of the first storage to the external equipment via the communication path and, when a communication error occurs on the communication path or in the equipment connected thereto, produces a status signal representative of the communication error. An outpout control section controls the read-out control section such that when the interface circuit produces the status signal, the operation for reading address data out of the second storage is interrupted. The detecting section feeds the end-of-read signal to the interface circuit.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The objects and features of the present invention will become more apparent from the consideration of the following detailed description taken in conjunction with the accompanying drawings which are given by way of illustration only and thus are not limitative of the present invention, and wherein:

FIG. 4 is a table also associated with the supervision of data storage in a memory card effected by the embodiment.

DESCRIPTION OF THE PREFERRED EMBODIMENT

Figure 1:
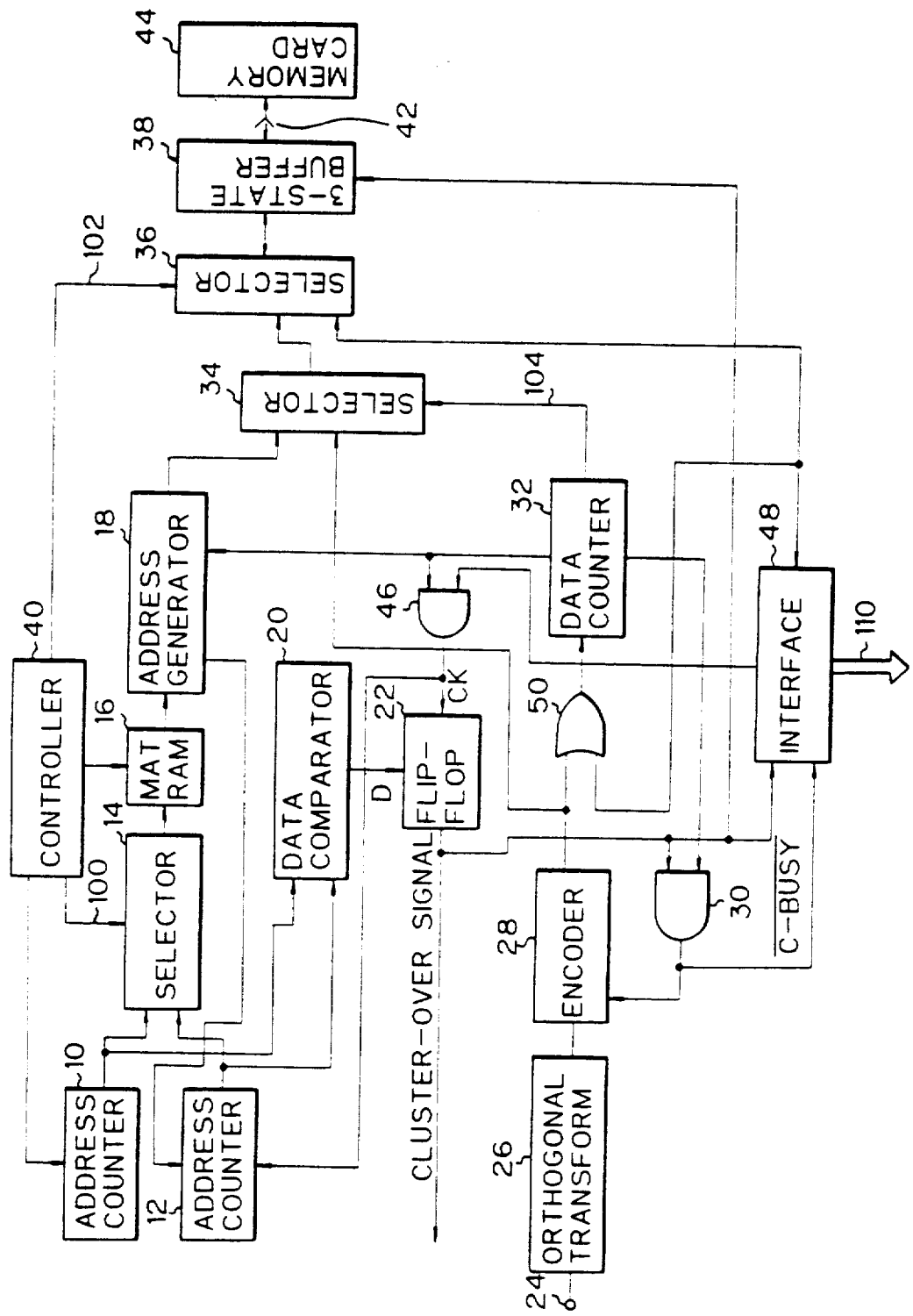
FIG. 1 is a block diagram schematically showing an audio/video data reproducing apparatus embodying the present invention.

Referring to FIG. 1 of the drawings, an audio/video data reproducing apparatus embodying the present invention is shown in a schematic block diagram. Regarding the data which the apparatus deals with, the illustrative embodiment will concentrate on video data although the present invention is similarly practicable with audio data. As shown in FIG. 1, the apparatus has an input terminal 24 to which video data generated by an electronic still camera, for example, is applied. An orthogonal transform section 26 and an encode section 28 cooperate to compress and thereby code the video data coming in through the input terminal 24.

Specifically, the orthogonal transform 26 performs two-dimensional cosine transform or similar orthogonal transform with the input video data. The output of the orthogonal transform 26 is connected to the encoder 28. The encoder 28 codes the transformed video data by a suitable coding technology such as Huffman coding. The output of the encoder 28 is connected to one input of a selector 34 and one input of an OR gate 50 which is in turn connected to a data counter 32. An address generator 18 is connected to another input terminal of the selector 34 for feeding address data designating a cluster, which will be described, to the selector 34. The data counter 32 delivers a control signal to the selector 34 over a control line 104. The selector 34 selects either one of the coded video data and cluster address data fed thereto from the encoder 28 and address generator 18, respectively, in response to the control signal from the data counter 32.

An interface circuit 43 is connected by a communication path 110 to external equipment, not shown, which is connected to the path 110. The data counter 32 counts the video data being outputted by the encoder 28 or video data being read out of a memory card 44 and transferred to the external equipment over the communication path 110. When the data counter 32 reaches a count corresponding to one cluster of video data, it generates a cluster change request signal. In this configuration, the OR gate 50 selectively outputs either one of the video data fed from the encoder 28 and the video data which is read out of the memory card 44 to be sent to the external equipment via the interface 48 and communication path 110. The cluster change request signal from the data counter 32 is directly applied to the address generator 18 or applied to an address counter 12 and a flip-flop 22 via an AND gate 46.

A MAT (Memory Allocation Table) RAM 16 stores the numbers assigned to clusters, i.e., cluster numbers which are referenced in the event of writing video data in a plurality of clusters of the memory card 44 or reading desired video data therefrom. To write video data in the memory card 44, a controller 40 determines which of the clusters defined in the memory card 44 are idle and sets up a particular order in which video data should be written to the idle clusters. Subsequently, the controller 40 writes in the MAT RAM 16 the cluster numbers, or address data, which designate the idle clusters. The address data representative of the clusters are sequentially transferred from the MAT RAM 16 to the address generator 18. In response, the address generator 18 generates 24-bit address data of which the upper eleven bits and lower thirteen bits inticate, respectively, a cluster number and a relative address within a cluster. The address generator 18 designates the leading address of each cluster by 24-bit address data whose lower thirteen bits are all ZEROs, and it sequentially increments the address. When a picture is to be recorded in the memory card 44, such 24-bit address data are used as real addresses designating clusters.

The illustrative embodiment has an address counter 10 in addition to the previously mentioned address counter 12. Before video data is written to or read out of the memory card 44, the address counter 10 counts the address data representative of clusters and written to the MAT RAM 16 by the controller 40, i.e., the number of clusters necessary for video data to be written or read. On the other hand, the address counter 12 counts the address data which are sequentially outputted by the address generator 18 during actual write-in or read-out of video data, i.e., the clusters to or from which video data have been actually read out. The outputs of the address counters 10 and 12 are connected to a selector 14. The controller 40 delivers a control signal to the selector 14 over a control line 100 to cause it to feed either one of the output signals of the address counters 10 and 12 to the MAT RAM 16. Specifically, the controller 40 so controls the selector 14 as to feed the output of the address counter 10 to the MAT RAM 16 during the course of preprocessing for recording or reproduction or to feed the output of the other address counter 12 to the MAT RAM 16 during the course of actual recording or reproduction.

The outputs of the address counters 10 and 12 are connected to a data comparator 20 as well as to the selector 14. The data comparator 20 compares the counts of the address counters 10 and 12 and, when they are equal, generates a coincidence signal. Specifically, the coincidence signal appears when video data have been fully written to the predetermined number of clusters or when video data have been fully read out of the predetermined number of clusters. The flip-flop 22 has a D terminal connected to the output of the data comparator 20 and a CK (clock) terminal connected via the AND gate 46 to the output of the data counter 32 on which the previously mentioned cluster change request signal appears. When the flip-flop 22 receives the cluster change request signal from the data counter 32 and the coincidence signal from the data comparator 20 at the same time, it generates a cluster over signal indicating that the recording or the reproduction of expected data has been completed. More specifically, the cluster over signal appears when the recording of video data in the preset number of clusters or the reproduction of video data from a given number of clusters is completed as indicated by the coincidence signal and the address generator 18 is ready to output the address data of the next cluster as indicated by the cluster change request signal.

The AND gate 46 receives at one input thereof the cluster change request signal from the data counter 32 and at the other input a status signal from the interface 48. The status signal shows whether or not a communication error has occurred on the communication path 110 or in the external equipment connected to the path 100, i.e., a personal computer or similar terminal. The status signal usually remains in a high level and, on the occurrence of a communication error, goes low. Hence, so long as the communication path 110 and the equipment both are free from errors, the data counter 32 feeds the cluster change request signal to the address generator 18 and flip-flop 22 without fail when one cluster of video data has been fully recorded or reproduced. At the same time, the address generator 18 outputs address data representative of the leading address of a cluster to record or reproduce next, and then the address is updated.

The interface 48 interfaces the memory card 44 to the personal computer or similar external equipment connected to the communication path 110, by way of a selector 36 and a tristate buffer 38 as well as the path 110. Another function of the interface 48 is to deliver a status signal to the AND gate 46 to show whether or not a communication error has occurred on the path 110 or in the external equipment, as stated earlier.

The cluster over signal from the flip-flop 22 is applied to one input of an AND gate 30. Applied to the other input of the AND gate 30 is the cluster change request signal which is generated by the data counter 32. On receiving both the cluster over signal and the cluster change request signal, the AND gate 30 delivers a signal $\overline{C\text{-BUSY}}$ to the encoder 28 and the interface 48. Specifically, when the predetermined number of clusters have been counted as indicated by the cluster over signal and the cluster next to such clusters in ready to be recorded or reproduced as indicated by the cluster change request signal, the AND gate 30 produces the signal $\overline{C\text{-BUSY}}$ to inhibit the encoder 28 or the interface 48 from outputting data. Usually, the signal $\overline{C\text{-BUSY}}$ goes low when the recording or the reproduction of video data is completed and again goes high when the above-stated AND holds.

The cluster over signal from the flip-flop 22 is further applied to the tristate buffer 38. The tristate buffer 38 selectively assumes either one of a state for storing video data and address data to be written to the memory card 44 via the selector 36 and a state for storing video data read out of the memory card 44, while preventing such video data from being outputted to the memory card 44 or to the selector 36. Specifically, on receiving the cluster over signal from the flip-flop 22, the tristate buffer 38 interrupts the transfer of video data to the memory card 44 or the transfer of video data from the memory card 44 to the external equipment via the controller 40 and interface 48. The selector 36 applies a control signal to the selector 36 over a control line 102 to connect it to the selector 34 or to the interface 48, as needed.

The interface 48 also receives the cluster over signal from the flip-flop 22, as stated previously. In response to the cluster over signal, the interface 48 and, therefore, the external equipment connected to the interface 48 by the path 110 recognizes that video data have been fully read out of the expected number of clusters of the memory card 44 and transferred to the equipment.

The memory card 44 is removably connected to the tristate buffer 38 by a connector 42. The memory card 44 has a semiconductor memory which is divided into a predetermined number of clusters, as stated earlier.

A reference will be made to FIG. 3 for describing a specific procedure for recording video data in the memory card 44.

Figure 3:
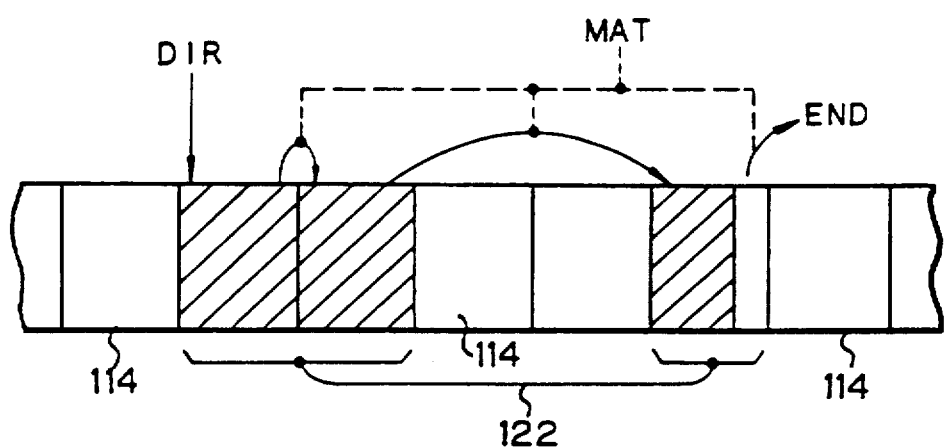
FIG. 3 schematically shows how the embodiment supervises the storage of data in a memory card.

As shown in FIG. 3, the storage area of the memory card 44 is equally divided into a predetermined number of clusters 114 having the same capacity. A plurality of clusters 114 which are indicated by hatching are selected to record video data representative of, for example, a single picture. Such particular clusters 114 are handled as a packet 122 collectively. While the clusters 114 constituting the packet 122 are shown as being discontinuous, they of course may be continuous. To record new video data, a required number of clusters are selected out of the clusters 114 except for full clusters to form a packet 122.

A prerequisite with this kind of recording scheme, i.e., selecting a given number of clusters 114 matching the amount of video data, is that the numbers assigned to clusters used be recorded packet by packet to allow the video data to be searched and read out afterwards. To meet this requirement, a portion of the memory which corresponds to the first cluster 114 is used as a supervisory area. As shown in FIG. 4, the supervisory area is made up of a header, a packet information area, a directory, and a MAT (Memory Allocation Table). The directory stores the start clusters of individual packets or video data, i.e., the numbers assigned to the leading clusters of the individual packets. The MAT stores the numbers assigned to clusters each following a particular cluster. Data read out of the directory and MAT facilitate the read-out of a picture. Specifically, a packet of video data will be readily read out if the number of the leading cluster associated with the packet is read out of the directory and then successive cluster numbers following the leadin cluster number are read out of the MAT.

The controller 40 controls the various sections constituting the data reproducing apparatus. Particularly, when desired video data is to be read out of the memory card 44, the controller 40 searches for a plurality of clusters storing the video data of interest, reads the numbers assigned to such clusters out of the memory card 44, and writes them in the MAT RAM 16.

A specific operation of the illustrative embodiment will be described with reference to FIG. 2.

To read desired video data out of the memory card 44, the controller 44 searches for a packet storing the video data of interest by referencing the supervisory area of the memory card 40. The controller 40 delivers the numbers assigned to the clusters which constitute the packet storing the desired video data to the address counter 10. At the same time, the controller 40 feeds a control signal to the selector 14 to connect it to the address counter 10. The address counter 10 counts the cluster numbers fed from the controller 40 while transferring them to the MAT RAM 16 via the selector 14. The MAT RAM 16 sequentially stores the incoming cluster numbers, i.e., the numbers of the clusters storing the video data which should be read out. As all the cluster numbers are fed from the controller 40 to the address counter 10, the address counter 10 stops counting and holds the count which it reached last. Assume that video data is read out of a packet of N clusters, as shown in FIG. 2. Then, the cluster number held in the address counter 10 last as mentioned above is N.

On completing the delivery of the cluster number to the address counter 10, the controller 40 sends a control signal to the MAT RAM 16 to cause it to start outputting the cluster numbers. Specifically, the MAT RAM 16 sequentially outputs 11-bit address data representative of the cluster numbers which are used to read out video data. Each 11-bit address data is fed from the MAT RAM 16 to the address generator 18. The address generator 18 handles the eleven bits of address data as an upper address and adds lower thirteen bits which are all ZEROs to the upper address, thereby producing 24-bit address data. This address data is transferred to the selector 34 and indicates a real address representative of the leading end of a cluster.

The data counter 32 feeds a control signal to the selector 34 over the control line 104 in order to switch it into connection with the address generator 18. Then, the data counter 32 delivers a cluster change request signal to the address generator 18 with the result that the address generator 18 sends the address data of the first cluster from which video data should be read to the selector 34. This address data is routed through the selector 34, selector 36, tristate buffer 38 and connector 42 to the memory card 44, designating the address representative of the cluster of the memory card 44 from which desired video data should be read. The address data is fed to the address counter 12 as well.

The status signal fed from the interface 48 to one input of the AND gate 46 remains in a high level so long as the communication path 110 and the external equipment connected to the path 110 are free from communication errors, as stated earlier. Hence, when the cluster change request signal from the data counter 32 is applied to the other input of the AND gate 46, it is fed to the CK terminal of the flip-flop 22 via the AND gate 46.

Subsequently, the selector 36 is switched into connection with the interface 48 by the control signal applied thereto from the controller 40 via the control line 102. As a result, the video data read out of the memory card 44 is sequentially transferred to the external equipment via the tristate buffer 38, selector 36, and interface 48. The selectors 34 and 36 each are repetitively switched over in the above-described manner. Therefore, address data representative of the leading addresses of successive clusters are fed to the memory card 44 cluster by cluster, while video data stored in the individual clusters are read out of the memory card 44.

Figure 2:
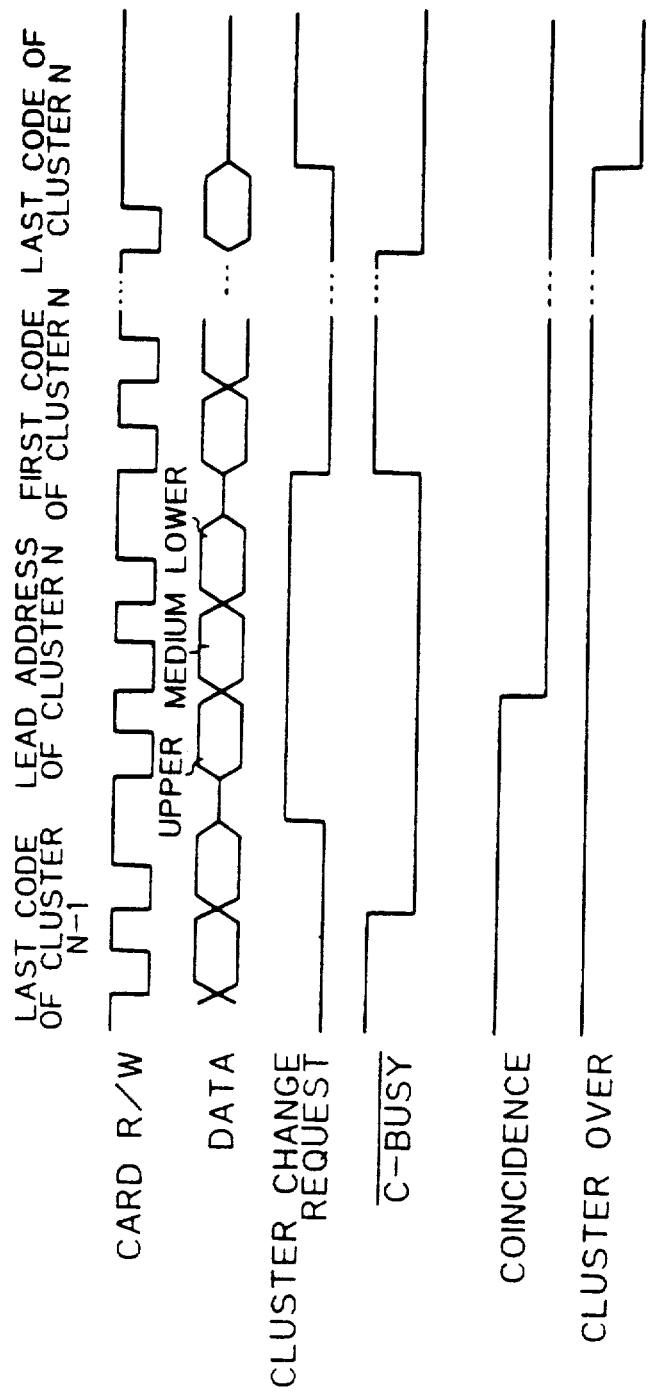
FIG. 2 is a timing chart representative of a specific operation of the embodiment.

As shown in FIG. 2, the leading address of a cluster is made up of a lower, a medium and an upper address each having eight bits. The lower, medium and upper addresses are sequentially transferred to the memory card 44 in response to a read/write (R/W) signal which is fed from the controller 40. The steps of transferring address data to the memory card 44 and reading compressed video data out of the card 44 are repeated. The address data outputted by the address generator 18 and representative of the respective clusters are also applied to the address counter 12 and counted thereby.

The procedure described above is repeated until video data have been read out of a given number, N, of associated clusters, as shown in FIG. 2. Every time the address generator 18 outputs address data representative of the leading address of each of N clusters, the address data is fed to the address counter 12, as stated above. Hence, when the address generator 18 generates address data representative of the leading address of the N-th cluster, i.e., when a cluster change request signal, FIG. 2, goes high, the address counter 12 holds the value N therein. The counts of the address counters 10 and 12 are fed to the data comparator 20 to be compared thereby. At this instant, because the value N has already been set in the address counter 10, a coincidence signal, FIG. 2, which is the output of the data comparator 20 goes low when the output of the address counter 12 reaches N.

The coincidence signal is fed from the data comparator 20 to the flip-flop 22. When the data counter 32 delivers a cluster change request signal associated with the "N+1" cluster to the CK terminal of the flip-flop 22, a cluster over signal, FIG. 2, which is the output of the flip-flop 22 and applied to the tristate buffer 38, goes low. As a result, the transfer of video data from the memory card 44 to the interface 48 via the selector 36 is interrupted. The cluster over signal is also applied to the interface 48 to inform it of the end of transfer of the predetermined number of clusters of video data to the external equipment.

Further, the cluster over signal is fed to the AND gate 30. The AND gate 30 produces AND of the cluster over signal and the cluster change request signal fed thereto from the data counter 32, thereby outputting a $\overline{\text{C-BUSY}}$ signal. Specifically, when the cluster change request signal goes high in response to the address data representative of the N-th cluster, the cluster over signal is in a low level. Hence, the AND gate 30 delivers the $\overline{\text{C-BUSY}}$ signal to the interface 48 when data is to be read out of the N-th cluster, based on the result of ANDing. As soon as all the video data stored in the N-th cluster are read out, the $\overline{\text{C-BUSY}}$ signal goes low with the result that the interface 48 stops transferring video data to the external equipment over the path 110. After the cluster over signal has gone low, the $\overline{\text{C-BUSY}}$ signal remains in a low level although the cluster change request signal may go high afterwards. This inhibits video data stored in the unexpected "N+1" cluster from being transferred to the external equipment via the interface 48.

Assume that some communication error has occurred on the path 110 or in the external equipment connected thereto while the transfer of video data from the memory card 44 to the equipment is under way via the interface 48 and path 110. Then, the status signal fed from the interface 48 to the AND gate 46 goes low. The AND gate 46, therefore, prevents a cluster change request signal from reaching the address counter 12 even when it is outputted by the data counter 32. Consequently, the address counter 12 is prevented from reading a cluster number out of the MAT RAM 16, so that the address generator 18 does not designate the leading address of the cluster to read out video data next. All that is required is, therefore, restarting the transfer of video data at the particular cluster from which video data was read out when the communication error occurred. Stated another way, the transfer of video data can be resumed without the addresses of the clusters of interest being set all over again. Otherwise, the address data representative of the clusters of interest would have to be set again via the MAT RAM 16 and address generator 18 and then fed to the memory card 44.

In summary, it will be seen that the present invention provides an audio/video data reproducing apparatus which, when an error occurs on a communication path to which it is connected or in external equipment connected to the path, inhibits address data designating the address of a cluster of a memory card from which audio/video data should be read out from being updated. It is not necessary, therefore, to set the addresses of clusters all over again before resuming the transfer of data from the memory card to the external equipment over the communication path.

Further, when audio/video data have been fully read out of an expected number of clusters of the memory card and transferred from the apparatus to the external equipment, a signal is fed to an interface circuit that interfaces the apparatus and the external equipment to each other to inform it of the end of transfer or read-out of the data. This allows the external equipment to recognize, via the interface circuit, that the transfer of the expected number of clusters of video data has ended.

While the present invention has been described with reference to the particular illustrative embodiment, it is not to be restricted by the embodiment but only by the appended claims. It is to be appreciated that those skilled in the art can change or modify the embodiment without departing from the scope and spirit of the present invention.

What is claimed is:

1. An audio/video data reproducing apparatus for reading out data from first storage means and for transferring the data to external equipment, the first storage means having a storage area equally divided into a plurality of storage units which each have a predetermined storage capacity for storing at least one of audio and video data on a storage unit-by-unit basis, the audio/video data reproducing apparatus comprising:

interface means for transferring the data read out from the first storage means to the external equipment over a communication path and for generating a first signal in response to an error occurring during transfer;

second storage means for storing first address data designating the storage units of the first storage means;

first control means, coupled to said second storage means and the first storage means, for searching for at least one of the storage units which stores the data to be read out and for storing the first address data designating the at least one storage unit searched for in said second storage means in a predetermined order;

address generating means, coupled to said second storage means, for sequentially reading out the first address data from said second storage means to generate second address data, which includes the first address data read out and which addresses a storage location of the storage area, and for supplying the second address data to the first storage means to enable the first storage means to develop the data in the predetermined order;

second control means, coupled to said interface means, for interrupting said address generating means from reading out the first address data from said second storage means in response to receipt of the first signal;

counting means, coupled to said interface means, for counting the data transferred by said interface means to determine when a predetermined amount of the data corresponding to the predetermined storage capacity of a storage unit has been transferred to produce a second signal, said address generating means operable in response to the second signal to read out the first address data designating another of the storage units, which includes the data to be read out next, to generate the second address data accordingly; and detecting means, coupled to said address generating means and said second control means, for comparing a number of the storage units searched for by said first control means with a number of the storage units of data transferred through said interface means to determine when both numbers coincide with each other, to generate and supply a third signal to said interface means indicative that reproduction is complete.

2. The audio/video data reproducing apparatus according to claim 1, wherein said address generating means comprises register means for storing the number of the storage units searched for by said first control means, said detecting means comprising:

additional counting means, operable responsive to said second control means, for counting the number of the storage units of data transferred; and comparator means, coupled to said register means and said additional counting means, for comparing both numbers to determine when both numbers coincide with each other to generate the third signal.

3. The audio/video data reproducing apparatus according to claim 1, wherein the first storage means comprises a memory card including the storage area, the audio/video data reproducing apparatus further comprising connector means for detachably connecting said memory card to said address generating means and said first control means.

4. The audio/video data reproducing apparatus according to claim 3, wherein said connector means comprises selector means, operable in response to said first control means, for selectively coupling said address generating means and said interface means to said memory card, said first control means controlling said selector means to supply the second address data to said memory card and the data read out from said memory card to said interface means.

5. The audio/video data reproducing apparatus according to claim 1, further comprising:

input means for receiving the data which is to be stored in the first storage means; and data compressing means, coupled to said input means, for compressing the data received by said input means prior to storage, said first control means controlling said address generating means and the first storage means to store the data in the storage area on the storage unit-by-unit basis.

6. An audio/video data reproducing apparatus comprising:

first storage means having a storage area equally divided into a plurality of storage units each having a predetermined storage capacity for storing at least one of audio and video data on a storage unit-by-unit basis;

interface means for transferring data read out of said first storage means to external equipment over a communication path and for generating a first signal in response to an error occurring during transfer;

second storage means for storing first address data designating the storage units of said first storage means;

first control means, coupled to said first storage means and said second storage means, for searching for at least one of the storage units which stores the data to be read out and for storing the first address data designating the at least one storage unit searched for in said second storage means in a predetermined order;

address generating means, coupled to said second storage means, for sequentially reading out the first address data from said second storage means to generate second address data, which includes the first address data read out and which addresses a storage location of the storage area, and for supplying the second address data to said first storage means to enable said first storage means to develop the data in the predetermined order;

second control means, coupled to said interface means, for interrupting said address generating means from reading out the first address data from said second storage means in response to receipt of the first signal;

counting means, coupled to said interface means, for counting the data transferred by said interface means to determine when a predetermined amount of the data corresponding to the predetermined storage capacity of a storage unit has been transferred to produce a second signal, said address generating means operable in response to the second signal to read out the first address data designating another of the storage units, which includes the data to be read out next, to generate the second address data accordingly; and detecting means, coupled to said address generating means and said second control means, for comparing a number of the storage units searched for by said first control means with a number of the storage units of data transferred through said interface means to determine when both numbers coincide with each other, to generate and supply a third signal to said interface means indicative that reproduction is complete.

7. The audio/video data reproducing apparatus according to claim 6, wherein said address generating means comprises register means for storing the number of the storage units searched for by said first control means, said detecting means comprising:

additional counting means, operable responsive to said second control means, for counting the number of the storage units of data transferred; and comparator means, coupled to said register means and said additional counting means, for comparing both numbers to determine when both numbers coincide with each other to generate the third signal.

8. The audio/video data reproducing apparatus according to claim 6, wherein said first storage means comprises a memory card including the storage area, the audio/video data reproducing apparatus further comprising connector means for detachably connecting said memory card to said address generating means and said first control means.

9. In an audio/video data reproducing apparatus, a method of reproducing data stored in storage means and transferring the data to external equipment via interface means, the storage means having a storage area equally divided into a plurality of storage units which each have a predetermined storage capacity for storing at least one of audio and video data on a storage unit-by-unit basis, the method comprising the steps of:

searching the storage means for desired data stored in the storage units;

counting address data of the storage units which store the desired data to generate a stored count number indicative of the number of storage units which store the desired data;

storing the address data of the storage units, after each address data is counted, in sequential order in address memory means;

reading the desired data sequentially out of the storage means in accordance with the stored address data after the address data of all the storage units which store the desired data have been counted and stored and transferring the desired data to the external equipment via the interface means, said step of reading comprising (a) reading a first address data of the storage units which store the desired data from the address memory means, (b) counting the read address data to generate a read count number indicative of the number of storage units from which the desired data has been read, (c) reading the desired data stored in the storage unit corresponding to the read address data, (d) transferring the desired data read from the storage unit corresponding to the read address data to the external equipment via the interface means, (e) repeating said substeps (a)-(d) for each remaining address data stored in the address memory means in the sequential order, and (f) comparing the read count number and the stored count number to generate a reproduction completion signal upon coincidence therebetween; and supplying the reproduction completion signal to the interface means and the storage means to interrupt further transfer of data therebetween.

10. The method of reproducing data of claim 9, wherein the desired data is transferred from the interface means to the external equipment via a communication line, the method comprising the further steps of:

generating an error signal upon detection of a communication error on the communication line or in the external equipment, the error signal being generated by the interface means;

disabling reading of a remaining address data from the address memory means; and repeating said substeps (c)-(d) for the read address data.

* * * * *